United States Patent Office 2,978,394
Patented Apr. 4, 1961

2,978,394

POLYELECTROLYTES IN ELECTROLYSIS

Samuel P. Moyer, Spokane, Wash., assignor to American Cyanamid Company, New York, N.Y., a corporation of Maine No Drawing. Filed Feb. 25, 1958, Ser. No. 717,310

6 Claims. (Cl. 204—108)

This invention pertains to the electrodeposition of metals from commercial aqueous systems including both electrowinning and electroplating by introducing synthetic polyelectrolytes into the cell electrolyte followed by a separation as by filtration or decantation of the electrolyte from the aggregated impurities prior to the electrolysis.

Electrowinning of metals is a convenient commercial process of separating metals and recovering them from ores by forming solutions of the metals and then by electrolysis depositing the metals from the cell liquor on suitable electrodes. Metals such as zinc, copper, nickel, cobalt, manganese and chromium are recoverable from acid systems, usually sulfuric acid systems. Other acids may be used but sulfuric is very cheap and convenient. Some metals are conveniently separated from cyanide solutions, such metals include gold, silver, copper, brass, and cadmium.

In addition to the massive recovery of the metals in electrowinning, certain metals particularly nickel, copper, chromium and silver, and sometimes cadmium and gold are plated onto other metals for either the protection of the other metals or esthetic considerations.

In such electrodeposition of metals it has been frequently found that under laboratory conditions using pure solutions satisfactory deposits are obtained, but, under commercial conditions, in which the cell feed electrolyte is formed by extracting ores with suitable electrolytes or by dissolution of metallic anodes, there are obtained finely divided impurities which cause difficulties in deposition. For example, in treating zinc the metal concentrates, frequently obtained by flotation, are roasted which converts the zinc existing in the ore in the form of sulfides, simple or complex, into the sulfate or oxides. The roast is treated with sulfuric acid solution which extracts the metal in the form of the soluble sulfate but at the same time leaves silica and other impurities as more or less finely divided, at least partly hydrated, solids. If allowed to settle or if filtered, much of the impurities or gangue is separated, but still sufficient passes the filter, or does not settle, so as to cause complications in the electrodeposition step. Filtration and settling are extremely difficult because of the fine particle size and colloidal characteristics of the suspended solids.

Sometimes in electroplating with baths in which the metal content of the solution is maintained by dissolution of suitable anodes, porous bags, or diaphragms, or filter systems are used in an effort to separate out and remove impurities before these impurities can codeposit on the cathode and cause specks, irregularities, pin holes, treeing, or other defects.

It has now been found that by introducing a water-soluble synthetic, polyelectrolyte of anionic characteristics into the electrolyte the suspended particles are caused to aggregate and flocculate which permits the easier separation of these impurities by settling or filtration or both so that a clear electrolyte free from colloidal particles is obtained and thus as the metal is deposited, there are no charged colloidal particles which may be co-deposited causing imperfections. Additionally, it would appear that under at least some conditions the anionic polyelectroytes tend themselves to concentrate on the sharper edges of the cathode and slow down the rate of deposition on such sharp corners, thus causing the intermediate areas to build up and thus giving a smoother, more uniform and brighter deposit.

Most of the advantages resultant from the use of the polyelectrolytes appear only where there is a separation step, preferably filtration, to remove aggregated impurities thus permitting smoother, more compact, adherent, reguline deposits.

The polyelectrolytes are preferably those resulting from the polymerization through aliphatic olefinic unsaturation in which the polymers contain the units from the polymerization of acrylamide, acrylic acid, and acrylonitrile monomers. The acrylonitrile may be at least partially hydrolyzed to either acrylamide or acrylic acid units. Other monomers may be introduced in the chain such as methacrylic acid, methacrylamide, vinyl chloride, styrene, vinyl alkyl ethers and the like without harming the essential anionic characteristics conducive to improved electrodeposition. It is preferred that at least half of the monomer units in the polymer be of acrylamide and it is desirable that at least some acrylic acid units be present.

Inasmuch as the water-soluble polyelectrolyte is principally effective towards impurities present, and inasmuch as the impurities can vary greatly in quantity and chemical characteristics, the quantity of the water-soluble polyelectrolyte required for most effective electrodeposition can widely vary. For purposes of convenience the quantity of the polyelectrolyte can be expressed on a weight basis on the amount of the electrolytic solution, and from one part per million for electrolytes which are readily amenable to treatment to one thousand parts per million for electrolytes containing difficultly settable, filtrable or highly colloidal impurities is a preferred operating range.

As illustrative of the results which may be obtained, in a commercial zinc plant treating the solutions obtained by the extraction of a zinc sulfide roast with sulfuric acid, 100 parts per milion of a 90% acrylamide-10% acrylic acid copolymer having a molecular weight of 300,000 is added directly to the electrolyte without any filtration and the results compared before and after the addition. The current efficiency after addition is approximately 30 to 40% lower and the recovery of zinc is 30 to 40% lower and the deposit of zinc is brittle and black. Without filtration, the addition of the polyelectrolyte to the colloid containing commercial electrolyte gave poor results.

The same electrolyte is then filtered with the same 100 parts per million of the same polyelectrolyte present and the clear filtrate electrolyzed and again compared with standard conditions. The current efficiency and recovery of zinc are improved and the deposited zinc is smoother, and more compacted than in the absence of the polyelectrolyte.

A similar electrodeposition is conducted in cell electrolyte containing 35 grams of copper per liter as copper sulfate in sulfuric acid. The electrolyte is fouled by the presence of suspended solids which build up during use. Polyacrylamide is added as a solution in amounts sufficient to give 5 parts per million parts of electrolyte, and mixed with cell feed which is allowed to settle. Following this treatment the cell feed is decanted from the settled solids and filtered. Filtration rates are doubled over those obtained on a portion of the bath which is treated similiarly except that the addition of polyacrylamide is omitted. The filtered electrolyte is then electrolyzed at a current density of 15 amperes per square foot and gives a cathode deposit which is uniformly smooth at its surface which is free of interfering solids. The polyacrylamide used shows an intrinsic viscosity of 5.5.

An additional advantage of the water-soluble polyelectrolyte is that settling operations are expedited and filtration may be accomplished at a higher rate thus saving on the cost of preparing the cell feed liquor.

Having thus described and exemplified my invention, I claim:

1. A process for electrodeposition of metals from commercial aqueous systems in hte electrowinning of ores and the electroplating of metals which comprises sequentially: introducing from 1 to 1000 parts per million parts of the electrolyte by weight of a water-soluble polyelectrolyte selected from the group consisting of acrylamide homopolymers and acrylamide copolymers containing at least half of the monomer units of acrylamide and the other half selected from monomer units containing an aliphatic olefinic unsaturated linkage, then filtering non-dissolvable finely divided impurities from the electrolyte, and then electrolyzing to recover the metal from the electrolyte.

2. A process for electrodeposition of metals from commercial aqueous systems in the electrowinning of ores and the electroplating of metals which comprises sequentially: introducing from 1 to 1000 parts per million parts of the electrolyte by weight of a water-soluble anionic polyelectrolyte containing acrylamide, acrylic acid and acrylonitrile polymer units, then filtering non-dissolvable finely divided impurities from the electrolyte, and then electrolyzing to recover the metal from the electrolyte.

3. A process for the electrolytic recovery of zinc from ores comprising sequentially: dissolving zinc ore values in an aqueous sulfuric acid solution, filtering non-dissolvable finely divided impurities from the zinc sulfate containing solution in the presence of from 1 to 1000 parts per million parts of solution by weight of a water-soluble polyelectrolyte selected from the group consisting of acrylamide homopolymers and acrylamide copolymers containing at least half of the monomer units of acrylamide and the other half selected from monomer units containing an aliphatic olefinic unsaturated linkage, then electrolyzing to recover the zinc.

4. A process for the electrolytic recovery of zinc from ores comprising sequentially: dissolving zinc ore values in an aqueous sulfuric acid solution, filtering non-dissolvable finely divided impurities from the zinc sulfate containing solution in the presence of from 1 to 1000 parts per million parts of solution by weight of a water-soluble anionic polyelectrolyte containing acrylamide, acrylic acid and acrylonitrile polymer units, and then electrolyzing to recover the metal therefrom.

5. A process for the electrolytic recovery of copper from ores comprising sequentially: dissolving copper ore values in an aqueous sulfuric acid solution, filtering non-dissolvable finely divided impurities from the copper sulfate containing solution in the presence of from 1 to 1000 parts per million parts of solution by weight of a water-soluble polyelectrolyte selected from the group consisting of acrylamide homopolymers and acrylamide copolymers containing at least half of the monomer units of acrylamide and the other half selected from monomer units containing an aliphatic olefinic unsaturated linkage, and then electrolyzing to recover copper.

6. A process for the electrolytic recovery of copper from ores comprising sequentially: dissolving copper ore values in an aqueous sulfuric acid solution, filtering non-dissolvable finely divided impurities from the copper sulfate containing solution in the presence of from 1 to 1000 parts per million parts of solution by weight of a water-soluble anionic polyelectrolyte containing acrylamide, acrylic acid and acrylonitrile polymer units, and then electrolyzing to recover the metal therefrom.

References Cited in the file of this patent

UNITED STATES PATENTS

| | | |
|---|---|---|
| 2,798,040 | Pye et al. | July 2, 1957 |
| 2,831,841 | Jones | Apr. 22, 1958 |
| 2,888,390 | Lapee | May 26, 1959 |
| 2,909,508 | Jones | Oct. 20, 1959 |

OTHER REFERENCES

American Electroplaters Monthly Review, May 1946, pages 513–526.

The Metal Industry, November 10, 1939, pages 415–417.